Sept. 8, 1936.  T. N. ADLAM  2,053,759
HEATING SYSTEM
Filed Dec. 30, 1932    3 Sheets-Sheet 1

Fig. 1.

INVENTOR
Thomas N. Adlam
BY Lawrence K. Sager
his ATTORNEY

Sept. 8, 1936.   T. N. ADLAM   2,053,759
HEATING SYSTEM
Filed Dec. 30, 1932   3 Sheets-Sheet 3

Patented Sept. 8, 1936

2,053,759

UNITED STATES PATENT OFFICE 2,053,759

HEATING SYSTEM

Thomas Napier Adlam, Bethlehem, Pa., assignor to Sarco Company, Inc., a corporation of New York Application December 30, 1932, Serial No. 649,553

20 Claims. (Cl. 236—91)

This invention relates to an improved heating system wherein the heating medium, such as steam, is automatically controlled according to requirements under different weather conditions so that the amount of heat supplied will accord with the change of conditions, such as the change in outside temperature. It is particularly adapted to the heating of buildings, but may also have other applications.

The invention is based upon the control of the volume of steam supplied by control of the velocity of the steam through an opening or throat in the supply pipe and is not dependent upon the steam pressure or affected thereby. With a certain adjustment the volume and velocity of the steam supplied remains constant, regardless of variations in pressure of the steam due to variations in back pressure of the system, or initial steam pressure. The invention is particularly well adapted for control of the heat supplied to different zones where the temperature requirements are different under different weather conditions. For example, the radiators, or heating elements, in one zone of a building may be quite sheltered and require a less volume of steam supply than another set of radiators in a more exposed part of the building. In accordance with this invention the volume of steam supplied to each zone may be automatically controlled according to the particular requirements of each zone and according to change of conditions to which each zone is subjected. I also provide coacting means, in large installations, or where additional control is desirable, which controls the temperature of the heating elements receiving the controlled volume of steam, by automatically varying the back pressure according to changes in temperature at a selected controlling location.

The main object of the invention is to so control the volume of steam supplied that the supply will be adequate for the required heating while avoiding any excess supply or waste of heat energy. Also when the weather conditions change, or the heat requirements change, the object is to automatically adjust the amount of heat supplied by control of the volume to give just the amount of heat for the changed conditions without exceeding or going below the required amount. In this way the cost of heating is reduced to a minimum amount, while at the same time insuring adequate heating under the varying conditions. A further object is to automatically vary the pressure imposed upon the return of the system in accordance with temperature changes at a controlling location so as to secure further control of the heat delivered in the area to be heated. A further object is to accomplish these results by simple and dependable controlling means. A further object is to provide apparatus that will require little or no attention over long periods of operation. A further object is to provide a heating system that is flexible and readily adaptable to any character of heat requirements either as a whole or in sub-divisions by zone control. A further object is to supplement the main control by auxiliary control from any selected point so that under particular conditions due to change in heat radiation or otherwise, the supplemental control will come into action to avoid unnecessary loss of heat. A further object is to provide adjustment of the supplementary control so that when the normal heat requirements are not desired, adjustment may be made conveniently to reduce or cut off the supply of the heating medium when the room temperature, for example, exceeds a predetermined amount and permit convenient adjustment back to normal conditions when desired. Other objects and advantages of the invention will be understood from the following description and accompanying drawings which illustrate a preferred embodiment of the invention.

Figure 1:
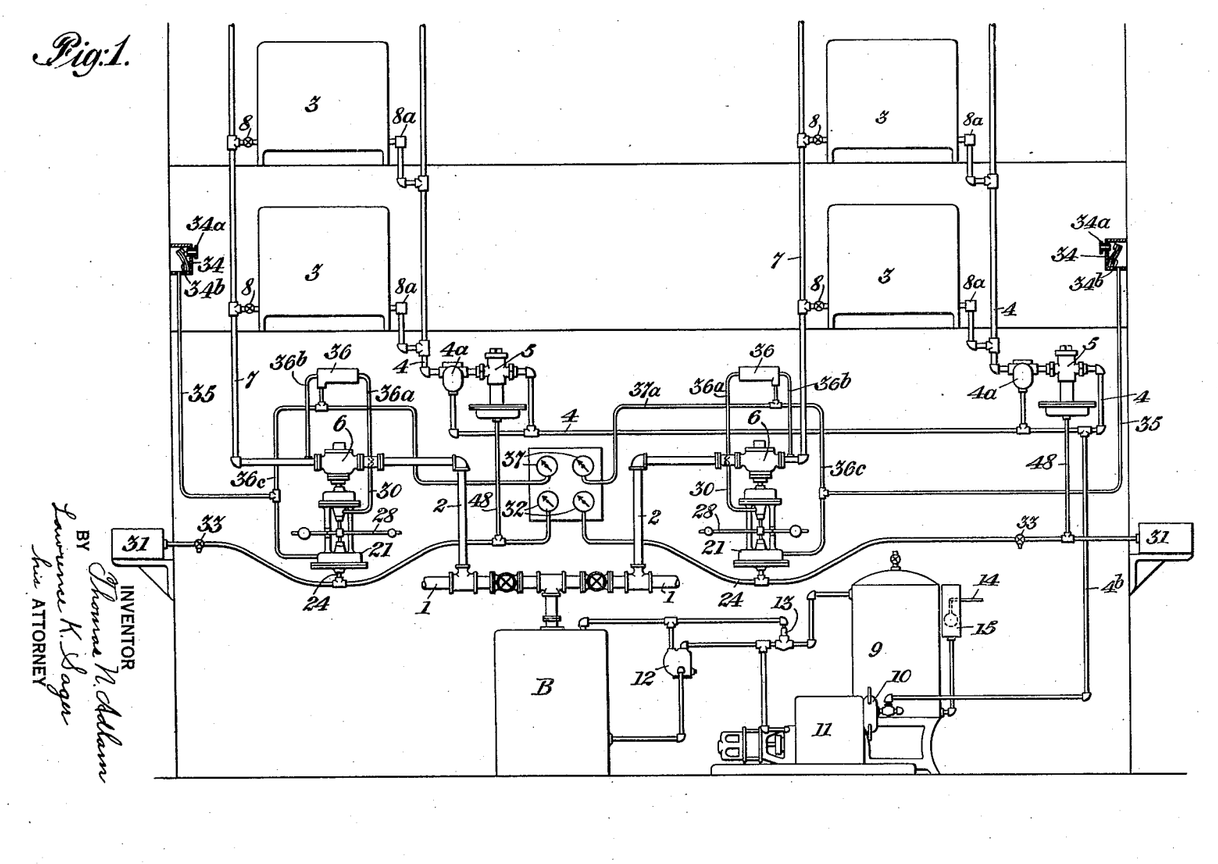
Fig. 1 is a general diagram of a heating system containing my improved controlling apparatus.

The layout of the system embodying my invention will, of course, depend upon the particular requirements of the building to be heated and the number of heating elements and relative location, but for the sake of clearness, I have indicated a heating system with one main supply pipe 1 and two branch pipes 2 each supplying a plurality of radiators or heating elements 3 in different zones each with a return 4 and a main trap 4a and each return having a return pressure controlling valve 5 which is in turn connected to a common return 4b. In some cases one supply pipe with its volume controlling valve may be sufficient for supplying all the radiators required, and in some cases, where a considerable number of zone divisions are desired, a number of supply pipes with their respective volume controlling valves and heating elements may be used, the valves for varying the return pressure being used when desired for further heating control. The boiler for supplying steam to the main pipe 1 is indicated at B, although the main supply pipe may be connected to any central steam supply, or other source of heat energy. The volume controlling valve generally indicated by the numeral 6 in Fig. 1 is connected to the supply pipe 2 and in turn delivers steam to the pipes 7 supplying the radiators, the latter having the usual radiator stop valves 8 in the inlet connections and the radiator traps 8a in the outlet connections which are connected with the return pipes 4. The common return 4b is connected to the condensate reservoir 9 through a strainer 10 and through a pump 11. The outlet of this pump is connected with the top of the reservoir 9 and also to a device 12 which automatically feeds return water to the boiler for maintaining the water therein at a predetermined level. Pipes connect the upper and lower portions of the boiler with the level maintainer 12 in order to equalize the pressure therein and insure the proper water level in each. Excess water is maintained in the reservoir 9 and a surplus pressure valve 13 insures sufficient pressure being maintained in the pump discharge for overcoming the pressure in the boiler to permit the passage of water thereto as controlled by the water level maintainer 12. An auxiliary supply pipe 14 is connected to the reservoir 9 through any suitable form of water level maintaining device 15 for the purpose of supplying water to the reservoir as required in order to maintain a predetermined water level therein.

Figure 2:
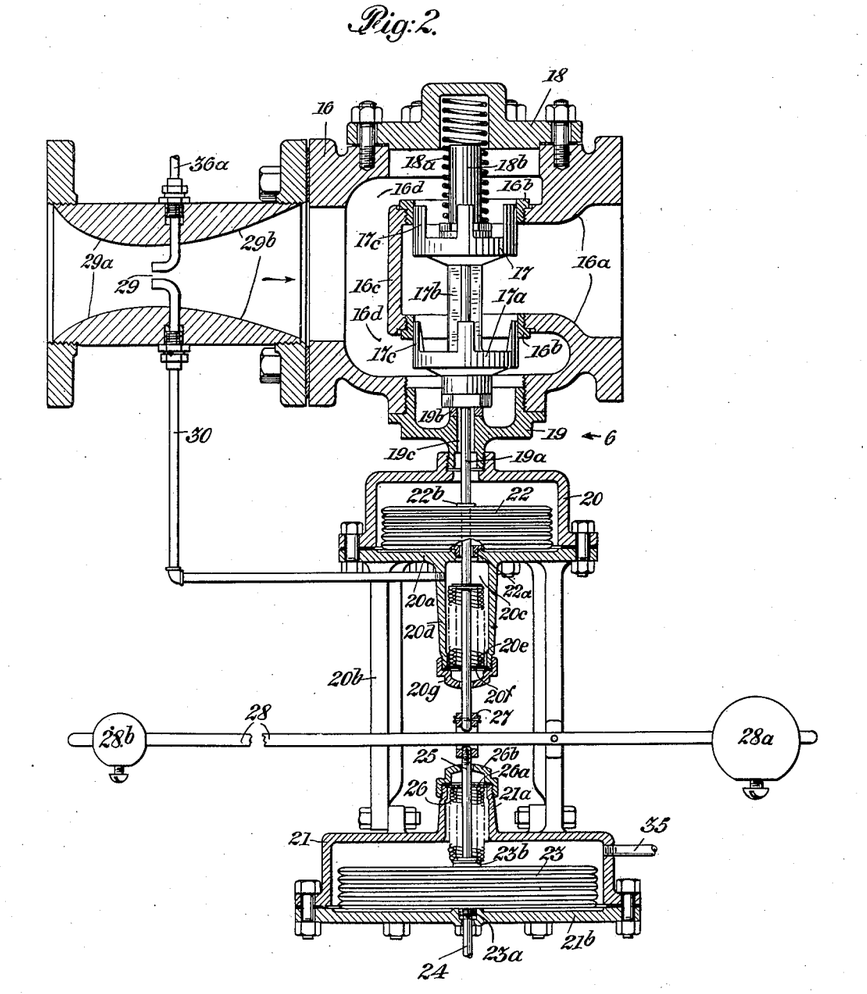
Fig. 2 is a vertical section of one form of valve for controlling the volume of steam or vapor supplied.

Referring now to Fig. 2 which shows the detailed construction of the volume controlling valve 6 of Fig. 1, the direction of steam supply is assumed to be from left to right, corresponding with the direction of flow in the position in which the right hand valve 6 of Fig. 1 is located, the left hand valve 6 of Fig. 1 being turned so that the flow is from right to left.

The valve has a main body portion 16 provided with flanges for connection to the supply pipe. Within the body of the valve are upper and lower portions 16a each having threaded central openings for receiving collars 16b which latter serve as guides for the movable element of the valve. The inlet side of the valve is closed by a vertical partition 16c extending between the partitions 16a, openings 16d being provided in the upper and lower partitions 16a at the inlet side to permit the steam to pass into the spaces between the partitions 16a and the top and lower body portions of the valve. The valve element is shown formed of two parts 17 and 17a having their main portions connected by the stem 17b. The parts 17 and 17a are provided with upward extensions 17c with circumferential openings between them, the extensions being slidable within the collars 16b. Evidently when the valve is moved downwardly the steam may pass through these openings and through the two collars to the outlet side of the valve. When the valve is moved upwardly, the volume of steam supplied is gradually reduced until the portions 17 and 17a engage the collars 16b, at which time the valve is closed.

On the top of the valve is a removable cap 18 having a cylindrical inner cavity in which a spring 18a is seated. This spring extends downwardly and freely around a cylindrical guide 18b carried by the movable valve element and engages the upper end of the movable element of the valve. This spring, unless otherwise opposed, will move the valve to its full open position. At the lower portion of the body of the valve is a threaded opening in which is seated a cap 19 and through which freely passes the extension 19a of the valve stem. The cap 19 limits the open position of the valve by the same coming against inner projections 19b of the cap.

A cylindrical casing 20 having a lower open end has a top enclosing portion, the top having a central opening for the passage of the valve stem extension. The top portion of the casing is provided with an internally threaded boss which has a threaded engagement with the lower extension of the cap 19 and is thus supported from and by the cap 19. The lower end of the casing 20 is closed by a plate 20a bolted thereto as shown with a gasket to form an air-tight joint, and the plate is provided with depending brackets 20b which support at its lower ends another cylindrical casing 21 open at its lower end and having its top portion closed except for an opening formed by an upper cylindrical extension 21a. The bottom of the casing 21 is closed by a circular plate 21b bolted to its lower end as shown with a gasket to form a tight joint.

Within the casing 20 is an expansible and compressible element 22 of the bellows type. This is supported and sealed at its lower end by a central nipple 22a which is screwed into the plate 20a to form a tight joint. The nipple 22a has a central opening so that the interior of the bellows is in communication by a passage through the plate 20a with a chamber 20c formed by a central tubular extension 20d from the bottom of the plate 20a. The top of the bellows 22 is closed and fixed at 22b to the valve rod 19a. Thus when the pressure within the bellows 22 exceeds the external pressure thereon, the expansion of the bellows will tend to move the rod 19a upwardly and tend to close the valve. The internal pressure is dependent upon the static steam pressure plus the pressure due to the velocity head of the steam, as later explained. The pressure exerted upon the exterior of the bellows 22 corresponds with the static pressure of the steam or vapor within the chamber of the body of the valve because the interior of the chamber 20 is in communication therewith by a passage 19c through which the valve rod extension 19a freely passes.

The valve rod 19a extends downwardly through the tube 20d and through an expansible and contractible bellows 20e. The upper end of this bellows is closed and secured to the valve rod and its lower end is open and secured to a plate 20f having a central opening and having its outer portion clamped with a gasket to form a tight joint between a cap 20g and the lower end of the tube 20d by a threaded engagement of the cap with the tube. The cap 20g has a central opening through which the rod 19a freely passes. Thus the inside of the bellows 20e is subjected to atmospheric pressure and the exterior to the pressure within the chamber 20c, the bellows thus serving as a seal of the chamber 20c and interior of the bellows 22 from atmospheric pressure.

Within the casing 21 is another expansible and compressible element 23 of the bellows type, the lower end of which is closed and carries a central nipple 23a having a tight threaded joint with the plate 21b. The interior of the bellows 23 is thus sealed from pressure within the casing 21. The plate 21b has a central opening to receive the end of a tube 24 which has a threaded engagement with the interior of the nipple 23a. Thus any pressure exerted within the tube 24 is transmitted to the interior of the bellows 23. The top of this bellows is closed, but has secured thereto at its center a disk 23b to which is fixed an upwardly extending rod 25 which passes centrally through the extension 21a. An expansible and contractible bellows 26 surrounds the rod 25 and has its lower end fixed to the disk 23b and hermetically sealed thereto. The upper end of this bellows is secured to a plate or ring 26a, the outer portion of which is clamped between the end of the extension 21a and a cap 26b through which the rod 25 freely passes. The cap 26b has a threaded engagement with the extension 21a so as to secure a tight joint with an intervening gasket and thus seal the interior of the bellows 26 from the pressure within the casing 21, the interior of the bellows being subjected to atmospheric pressure.

The upper end of the rod 25 has a threaded engagement with and passes through the lower side of a ring 27. The lower end of the rod 19a passes through the upper side of this ring and is secured thereto. A lever arm 28 is pivotally mounted on one of the brackets 20b and passes axially through the ring 27 and is engaged therein by the rounded ends of the rods 19a and 25. The lever 28 is weighted at one end by an element 28a which is adjustable lengthwise on the lever 28. This weight obviously exerts an upward pressure on the valve rod 19a tending to close the valve against the pressure of the spring 18a. The opposite end of the lever 28 carries another weighted element 28b of small weight compared to that of the element 28a and is adjustable along the lever 28 for refined adjustment of the upward pressure of this lever upon the valve rod.

In the main supply pipe, shown at the incoming end of the valve in Fig. 2, is a section provided with a definitely formed opening 29 or throat, preferably in the form of a Venturi tube with converging entrance walls 29a and diverging outlet walls 29b, although it may be of other shape. Opposite this throat is an axially extending tube 30, its location being such that the pressure in this tube responds to change of velocity head of the heating medium through the throat 29. This tube passes out through the supply pipe and is connected at its other end to the chamber 20c of the valve which results in the bellows 22 being subjected to an inside pressure corresponding to the velocity pressure imposed upon the tube 30. This tube and the interior of the bellows 22 will also be subjected to the static pressure of the steam, but the static pressure is offset or counteracted by the pressure exerted upon the exterior of the bellows 22, because it receives the static pressure of the heating medium owing to the interior of the casing 20 being in direct communication with the space within the body of the valve, as already explained. Thus the bellows 22 is directly responsive in its upward pressure tending to close the valve, to any change in the velocity or volume of steam passing through the throat 29.

Now referring to Fig. 1, the volume control valve is shown as having the pipe 30 connected as just described, and Fig. 1 also shows the pipe 24 connected with the interior of a temperature responsive pressure device 31. This may be any form of thermostatic device in which the pressure exerted will correspond to change of temperature. The drawing shows the preferred form of this device as being an airtight box or drum, the pressure of which is communicated through the pipe 24 to the interior of the bellows 23. This may contain air or any gas whose expansive pressure varies directly with change of temperature. This device 31 may be located in any key position for controlling the volume of heating medium supplied to the radiators and is preferably located out-of-doors so that the volume of heat supplied with change of weather will correspond to the changes of the out-of-doors temperature. For convenience in supplying information to the boiler room or any other desired location, the pipe 24 is also connected to a pressure gauge 32 which may be graduated in degrees so that the temperature at the key location may be read directly. Sufficient air is pumped into the container 31 in any convenient way, such as through the valve 33 in the pipe 24 so that the gauge 32 will give correct temperature readings and so that the controlling valve will function as desired. This form of thermostatic controlling means may therefore be readily adjusted and kept in proper working condition simply and conveniently by anyone in charge, without the necessity of bothering with volatile liquids or electrical contrivances.

The throat 29 is calibrated to create a definite velocity of the steam when the particular zone is taking its maximum demand in extreme weather and with the controlling valve fully open. Under such conditions the pressure of the air in the reservoir 31 is not sufficient, together with the upward force exerted by the lever 28 and the upward force due to the velocity head in the pipe 30 within the bellows 22, to overcome the weight of the valve and pressure of the spring 18a. The valve under these extreme weather conditions will then allow just a sufficient quantity of steam to pass through the throat 29 at a definite velocity which will be just sufficient to supply the required heat to meet these extreme weather conditions for the particular zone controlled. When the temperature rises, the air or gas in the reservoir 31 expands and causes the pressure within the bellows 23 to increase and move the valve in a direction tending to close it. With a certain increased pressure in the bellows 23 corresponding to a certain temperature of the drum 31, the valve will automatically deliver a certain volume of steam corresponding to that temperature. Thus assuming a certain pressure in bellows 23 tending to close the valve, the velocity head imposed upon the tube 30 will responsively exert a certain pressure within the bellows 22 and the valve will assume a normal position corresponding to the outside temperature. If while the external temperature and the pressure in the bellows 23 remains constant, the volume of the heating medium passing through the valve should from any cause decrease slightly from the normal amount, the velocity head imposed upon the tube 30 would decrease slightly and lower the pressure in bellows 22 and permit the valve to open somewhat more and so restore the volume delivered to its normal amount. If the volume delivered should exceed the normal, the velocity head increases in tube 30 and serves to move the valve somewhat towards its closed position and thus maintains delivery of a substantially constant volume of steam regardless of other changes provided the outside temperature and pressure in bellows 23 remains constant. When the outside temperature and pressure in bellows 23 change, the valve will assume a new intermediate balanced position corresponding thereto and automatically be controlled to deliver a volume of steam of substantially constant amount corresponding to just the amount required by the external temperature.

Thus the velocity of steam through the throat 29 and consequently the volume of the heating medium supplied to the radiators is controlled to correspond with the amount required and to deliver sufficient heat corresponding with the changes in weather conditions, while at the same time avoiding any excess or waste. This control also has the advantage of being independent of changes in initial steam pressure or changes in back pressure due to any variations therein from various causes. The method of control and the controlling means or apparatus is therefore a velocity and volume control of the heating medium supplied from the main source, as distinguished from steam pressure regulation, or any dependence thereon.

In some cases, it may be desired to supplement the controlling means already described with a supplemental control to further conserve the supply of heat energy where particular conditions permit. Although it may be comparatively cold out-of-doors, other weather conditions, or the location of the building or zone controlled may be such that the normal heating requirements are unnecessary, as when the weather is calm or when the atmosphere is emitting radiation to the building instead of receiving heat therefrom. In such cases the required inside temperature will be reached with a less volume of steam than is demanded by the actual outside temperature.

For meeting such conditions, an auxiliary control is imposed upon the valve to close the same until the room temperature, or the temperature at some selected location, has been reduced to normal, at which time the valve will be restored to the character of control already described.

This supplemental control may be accomplished in various ways, but the particular form herein disclosed comprises controlling means for the purpose of closing the valve by creating a vacuum of a predetermined amount within the casing 21 and on the exterior of the bellows 23 when the temperature at the supplemental control location attains a certain value. In Fig. 1 is indicated a thermostatic device in the form of a closed box 34 having a small opening through which an adjustable screw 34a passes. The screw has a central hole which normally places the box in communication with the air of the room or of any other place where this device is located. A thermostatic element 34b of any suitable form, shown as a bimetallic strip, is located to close the opening to the box upon the temperature reaching a predetermined amount. A tube 35 passes from the interior of the box to the interior of the casing 21 of the controlling valve. An ejector 36 is connected to the supply pipe, having the steam supply end connected by a pipe 36a to a section of the main supply pipe 2 and extending axially within the same to bring its open end opposite the throat 29. The steam intake of the ejector is thus subjected to the velocity head of the steam at the throat as well as the static pressure of the steam. The steam outlet of the ejector is, as shown in Fig. 1, connected by a pipe 36b with a section of the supply pipe on the outlet side of the valve. The suction pipe 36c of the ejector is connected with the thermostatically controlled pipe 35, as well as with the interior of the casing 21 of the valve.

In operation, with the temperature at the location of the thermostatic device 34 below a predetermined amount, the thermostatic element 34b will assume a position to cause the box to be open to the atmosphere. Under this condition the ejector will draw air through the open valve of the thermostat and permit the interior of the casing 21 and exterior of the bellows 23 to be normally subjected to substantially atmospheric pressure. When, however, the temperature of the thermostatic location attains a value for which the thermostat is set, the opening in the box 34 through the screw 34a will be closed and prevent the entry of air. This causes a vacuum to be built up in the pipe line 35 and also in the chamber surrounding the bellows 23. The effect of this vacuum, or reduction of pressure, on the outside of the bellows 23 is similar to a great increase in pressure within the bellows 23, resulting in the valve stem being lifted and causing the steam control valve to be closed. This prevents steam from passing to the zone controlled regardless of the outside temperature or the temperature at the point of location of the drum 31. As soon as the temperature at the location of the thermostatic box 34 falls below that at which this thermostat is set, the air valve will open and relieve the exterior of the bellows 23 from its vacuum and so restore control of the steam valve to outside temperature conditions at the location of drum 31. For the convenience of the person in charge, a pressure gauge 37 is conveniently located for inspection and will show, by a pipe connection 37a to the pipe 36c, whether or not the thermostatic device 34 is open to the atmosphere, or whether it has closed to impose a vacuum within the casing 21 for closure of the steam valve.

The inside thermostat also, by adjustment of the screw 34a, allows the building to be kept at a lower temperature during the night, or whenever desired, for the adjustable screw can be set to cause the steam valve to be closed at any desired lower temperature and then re-set in the morning for insuring fulfillment of normal heating requirements. Thus a further saving of heat energy may be obtained by convenient adjustment of the thermostat during periods when the normal degree of heating is unnecessary. This supplemental control also has the advantage of avoiding the use of electrical devices or volatile liquids and is so simple that it can readily be cared for by anyone in charge.

In cases where a pump, such as the pump 11, is operating continuously on the return of the system, the special ejector 36 becomes unnecessary as sufficient suction may be obtained for closing the volume control valve, by a pipe connection directly between the pipe 35 and the suction end of the pump. The resulting operation in affecting the volume control valve would be the same in such a case, as already described, the closing of the opening in the box 34 upon its temperature attaining a certain value, causing a sufficiently reduced pressure to be imposed upon the exterior of the bellows 23 to close the main controlling valve and keep it closed until the temperature at the box 34 decreased sufficiently to open the same to atmosphere.

Further control of the heat energy may be obtained by combining with the system already described and by super-imposing upon its controlling functions, a supplemental control of the pressure imposed upon the returns of the system. By variation of the back pressure, the temperature of the radiators may be varied and with the same volume of steam supplied by the volume control valve, the heat yielded by the radiators may be varied. Thus assume that the volume control valve is fully opened for maximum delivery of the volume of steam under very cold weather conditions, then if the returns on the system be caused to give a comparatively high back pressure, the temperature of the radiators will be correspondingly raised and the heat delivered by them for extreme weather conditions be correspondingly increased. Similarly, under normal changes of weather conditions, if during cold weather the back pressure be made high, the heat delivered by the radiators is greater, and under warmer conditions of the weather if the back pressure be changed to a lower amount, the heat delivered by the radiators is correspondingly decreased. This change of back pressure will, however, have no effect upon the volume of steam supplied by the volume control valve under the varying conditions, but serves in conjunction therewith to increase the range of control and to secure a more exact control of the heat delivered by the radiators under normal variations of weather conditions.

Figure 3:
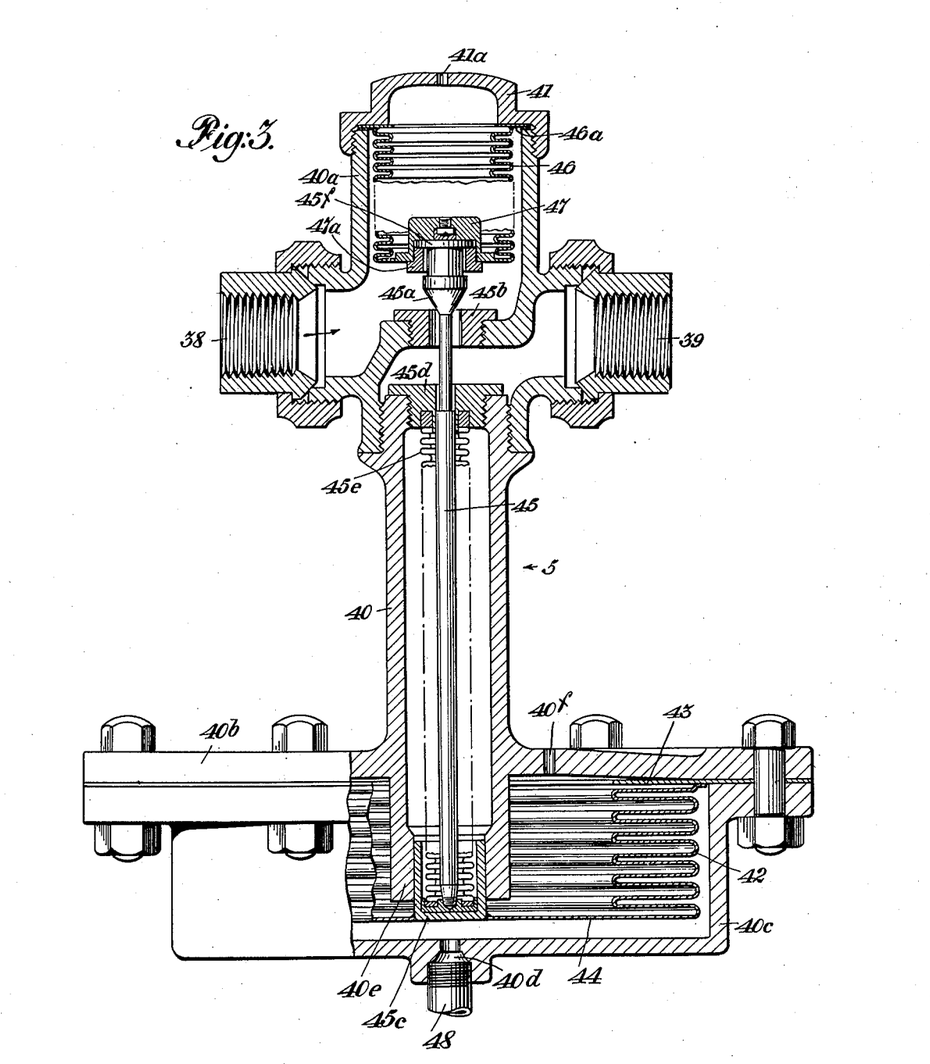
Fig. 3 is a vertical section of one form of valve for automatically varying the pressure imposed upon the return of the heating system.

This is accomplished by introducing in the common return of each zone a valve 5, as shown in Fig. 1, or in the main return where there are no zone divisions, which valve will serve to automatically vary the back pressure in accordance with change in external weather conditions, or change in temperature at some selected location. A preferred form of construction for this valve 5 is shown in Fig. 3 and is disclosed and claimed in its general applications in my pending application Serial #566,637, filed October 3, 1931. The valve 5 is connected in the return following the main trap 4a so as to avoid passing the water of condensation through the valve and thus permit the same to be made correspondingly similar.

Referring to Fig. 3, the inlet of the valve 5 is shown at 38 and the outlet to the vacuum pump 11 is indicated at 39. The main body portion 40 of the valve has an upper portion 40a which is closed by a cap 41. The lower portion of the valve is expanded in the form of a plate 40b to which is secured on its under side a hollow cylindrical box portion 40c. Within this cylindrical portion is located a flexible element responsive to variations in pressure and shown in the form of an expansible and contractible bellows type element 42. The upper portion of this element is hermetically sealed by connection to a plate 43 in the form of a ring which is clamped with suitable gaskets between the flanges of the portions 40b and 40c of the valve. The lower portion of the bellows is hermetically sealed by a plate 44. The lower surface of the portion 40c of the valve is perforated to receive a pipe connection at 40d. Thus the plate 44 is subjected on its lower side to the pressure imparted through the opening 40d and on its upper side to the impressure imposed thereon, with the result that the plate 44 will tend to assume and maintain a position determined by the difference in pressure on the two sides of the plate 44, according to their respective exposed areas.

Within the vertical portion of the valve is a rod 45 which carries at its upper end a valve element 45a adapted to seat against the valve seat 45b when the valve stem 45 is moved downwardly. Below the plate portion 40b of the valve and extending within the middle portion of the bellows 42 is a cylindrical projection 40e. This forms a guide for a cylindrical cup shaped element 45c which is united at its bottom with the plate 44. This element 45c has a sliding fit with the interior of the extension 40e and has fixedly secured thereto, in any suitable manner, the lower end of the valve stem 45. The upper portion of the valve stem 45 has a sliding fit with the interior of a nut 45d which nut engages with and closes the upper intermediate portion of the valve body 40 from the outlet portion of the valve. An expansible and contractible element 45e shown in the form of a bellows, surrounds the main portion of the valve stem 45, being hermetically sealed at its upper end to the lower face of nut 45d, and at its lower end to the interior of the element 45c. The bellows 45e evidently seals the pressure to which the interior of the bellows 42 is subjected from the pressure imposed upon the valve outlet 39 or, when the valve is open, the degree of vacuum or absolute pressure imposed upon the return of the system.

In the upper portion of this regulating valve is located within the portion 40a, another flexible responsive element 46, shown in the form of a corrugated or bellows type responsive device. The upper end is hermetically sealed to and connected with a ring 46a which is held in place with suitable gaskets between the cap 41 and the body portion 40a. The cap 41 is perforated as at 41a so that the interior of the bellows 46 is subjected to atmospheric pressure. The lower end of the bellows 46 is closed by the plate or flange of a hollow nut 47 which is located within the lower portion of the bellows and receives a nut 47a at its interior lower end. In the space between the upper end of the nut 47a and the interior portion of the nut 47 is located a flange 45f on the upper end of the valve stem. The position of the valve 45a is, therefore, additionally controlled by the difference between atmospheric pressure within the bellows 46 and the vapor pressure at the valve imposed upon the return of the system.

The interior of the bellows 42 is subjected to atmospheric pressure by means of an opening 40f in the plate 40b above the bellows. The opening 40d is connected by a pipe 48 with any suitable pressure controlling device responsive to changing conditions such as the out-of-doors temperature; and in Fig. 1 the pipe 48 is shown connected to the pipe 24 and thereby to the drum 31, already described. The pressure upon the exterior of the bellows 42 will consequently vary according to change in temperature of the drum 31, although the pipe 48 may be connected to any other type of variable pressure control placed at any desired location. As shown in Fig. 1 each heating zone has its volume valve 6 and its back pressure valve 5 controlled by its respective pressure device 31 located at a position suitable for control of the radiators of its particular zone.

In operation, when the regulating valve is open to its maximum amount, the pump 11 is given full opportunity to impose its full degree of vacuum or lowest absolute pressure upon the returns of the system and thereby reduce the temperature of and heating which the radiators 3 are permitted to yield. By adjustment of the valve to various intermediate positions according to the controlling effects, the degree of vacuum or pressure imposed upon the system is made such that the temperature of the radiators and the heat delivered are made to correspond with the changes in temperature of the responsive device 31. Thus a rise in temperature at the device 31 will cause the air therein to expand and to increase the pressure on the outside of the bellows 42 and thereby cause the valve element 45a to be moved further away from its seat. This further opening of the valve permits the vacuum pump to act more effectively in reducing the absolute pressure imposed upon the return of the system and thereby reduce the delivery of heat from the radiators 3. The lowering of the absolute pressure in the return of the system will cause reduction of pressure on the exterior of the bellows 46. As the inside of this bellows is exposed to atmospheric pressure, the lowering of the absolute pressure in the return pipe causes a downward force to be exerted against the upward force due to the increased pressure on the exterior of the bellows 42. This results in the valve assuming an intermediate position of adjustment which corresponds to that required by and imposed by the outside temperature. It will be noted that the exposed area of the exterior plate 44 of the bellows 42 is much larger than the exposed area of the lower outside end of the bellows 46 and these areas are relatively proportioned so that the valve will assume an adjusted intermediate position corresponding to that required and resulting from the differential upward and downward pressures exerted on the plate 44 and the lower outside end of the bellows 46 respectively.

Thus the range of control resulting from the volume control valve 6 is increased by the use of the variable control in the back pressure resulting from the use of the valve 5, while there is also secured refinement in control of the heat delivered by the radiators throughout the intermediate variations in the outside temperature. Furthermore, in obtaining this combined control of the heat delivered, the volume of steam delivered by the volume control valve will remain the same for any adjusted position thereof, regardless of changes in the back pressure due to the valve 5.

It is evident that by the use of this invention the amount of heat energy supplied to fulfill the requirements is reduced to a minimum and results in a very considerable saving in cost of heating. The invention is very flexible in its adaptability to various types of installations as well as to heating systems already installed; and although I have shown and described a particular disclosure of the invention, it may be embodied in various forms of controlling apparatus and in various relationships without departing from the scope thereof.

I claim:

1. In a heating system, the combination with heating elements of a valve for controlling the supply of heating medium thereto, a pressure device tending to open the valve, an opposing pressure device responsive to the velocity head of the medium passing through the valve for automatically maintaining an approximately constant volume of flow of the medium through the valve, and means for changing the adjustment of the valve to cause said opposing pressure device to automatically maintain a different approximately constant volume of flow of the heating medium through the valve.

2. In a heating system, the combination with heating elements of a valve for controlling the supply of heating medium thereto, a pressure device tending to open the valve, an opposing pressure device responsive to the velocity head of the medium passing through the valve for automatically maintaining an approximately constant volume of flow of the medium through the valve, and means responsive to change of temperature at a key location for changing the adjustment of the valve to cause said opposing pressure device to automatically maintain a different approximately constant volume of flow of the heating medium through the valve.

3. In a heating system, the combination with heating elements of a valve for controlling the supply of heating medium thereto, a conducting element through which the heating medium passes having a throat, a pressure device tending to open the valve, an opposing pressure device responsive to the velocity head of the medium passing through said throat for automatically maintaining an approximately constant volume of flow of the medium through said valve, and means for changing the adjustment of the valve to cause said opposing pressure device to automatically maintain a different approximately constant volume of flow of the heating medium through the valve.

4. In a heating system, the combination with heating elements of a valve for controlling the supply of heating medium thereto, a conducting element through which the heating medium passes having a throat, a pressure device tending to open the valve, an opposing pressure device responsive to the velocity head of the medium passing through said throat for automatically maintaining an approximately constant volume of flow of the medium through said valve, and means responsive to change of temperature at a key location for changing the adjustment of the valve to cause said opposing pressure device to automatically maintain a different approximately constant volume of flow of the heating medium through the valve.

5. In a heating system, the combination with heating elements of a valve for controlling the supply of heating medium thereto, means subjected to the velocity head of the medium passing through the valve for automatically maintaining an approximately constant volume of flow of the medium through the valve, means for changing the adjustment of the valve to cause said first-named means to automatically maintain a different approximately constant volume of flow of the heating medium through the valve, and additional controlling means whereby the valve may be automatically closed.

6. In a heating system, the combination with heating elements of a valve for controlling the supply of heating medium thereto, means subjected to the velocity head of the medium passing through the valve for automatically maintaining an approximately constant volume of flow of the medium through the valve, means responsive to change of temperature at a key location for changing the adjustment of the valve to cause said first-named means to automatically maintain a different approximately constant volume of flow of the heating medium through the valve, and supplemental controlling means whereby the valve will be automatically moved towards the closed position upon the temperature at another key location attaining a predetermined value.

7. In a heating system, the combination with heating elements of a valve for controlling the supply of heating medium thereto, a conducting element through which the heating medium passes having a throat, means responsive to the velocity head of the medium passing through said throat for automatically maintaining an approximately constant volume of flow of the medium through said valve, means responsive to change of temperature at a key location for changing the adjustment of the valve to cause said first-named means to automatically maintain a different approximately constant volume of flow of the heating medium through the valve, and supplemental controlling means whereby the valve will be automatically moved towards the closed position upon the temperature at another key location attaining a predetermined value.

8. In a heating system, the combination with heating elements of a valve for controlling the supply of heating medium thereto, a pressure device tending to open the valve, an opposing pressure device responsive to the velocity head of the medium passing through the valve for automatically maintaining an approximately constant volume of flow of the medium through the valve, means responsive to change of temperature at a key location for changing the adjustment of the valve to cause said opposing pressure device to automatically maintain a different approximately constant volume of flow of the heating medium through the valve, and supplemental controlling means whereby the valve will be automatically moved towards the closed position upon the temperature at another key location attaining a predetermined value.

9. In a heating system, the combination with heating elements of a valve for controlling the supply of heating medium thereto, a conducting element through which the heating medium passes having a throat, a pressure device tending to open the valve, an opposing pressure device responsive to the velocity head of the medium passing through said throat for automatically maintaining an approximately constant volume of flow of the medium through said valve, and means responsive to change of temperature at a key location for changing the adjustment of the valve to cause said opposing pressure device to automatically maintain a different approximately constant volume of flow of the heating medium through the valve, and supplemental controlling means whereby the valve will be automatically moved towards the closed position upon the temperature at another key location attaining a predetermined value.

10. A controlling valve comprising a movable valve element, a pressure device tending to move said element to open position, a flexible device responsive to the velocity head of the fluid passing through the valve tending to move said element to the closed position, and a second flexible device responsive to a variable pressure tending to move said element to the closed position.

11. In a heating system, the combination with heating elements of a valve for controlling the supply of heating medium thereto, means subjected to the velocity head of the medium passing through said valve for automatically maintaining an approximately constant volume of flow of the medium through said valve, and means comprising a valve for automatically adjusting the pressure imposed upon the return of the system according to change of temperature at a selected location.

12. In a heating system, the combination with heating elements of a valve for controlling the supply of heating medium thereto, means subjected to the velocity head of the medium passing through the valve for automatically maintaining an approximately constant volume of flow of the medium through the valve, means for changing the adjustment of the valve to cause said first-named means to automatically maintain a different approximately constant volume of flow of the heating medium through the valve, and means comprising a valve for automatically adjusting the pressure imposed upon the return of the system according to change of temperature at a selected location.

13. In a heating system, the combination with heating elements of a valve for controlling the supply of heating medium thereto, means subjected to the velocity head of the medium passing through the valve for automatically maintaining an approximately constant volume of flow of the medium through the valve, means responsive to change of temperature at a key location for changing the adjustment of the valve to cause said first-named means to automatically maintain a different approximately constant volume of flow of the heating medium through the valve, and means for automatically adjusting the pressure imposed upon the return of the system according to change of temperature at a selected location.

14. In a heating system, the combination with heating elements of a valve for controlling the supply of heating medium thereto, means subjected to the velocity head of the medium passing through the valve for automatically maintaining an approximately constant volume of flow of the medium through the valve, means for changing the adjustment of the valve to cause said first-named means to automatically maintain a different approximately constant volume of flow of the heating medium through the valve, additional controlling means whereby the valve may be automatically closed, and means for automatically adjusting the pressure imposed upon the return of the system according to change of temperature at a selected location.

15. In a heating system, the combination with heating elements of a valve for controlling the supply of heating medium thereto, means subjected to the velocity head of the medium passing through the valve for automatically maintaining an approximately constant volume of flow of the medium through the valve, means responsive to change of temperature at a key location for changing the adjustment of the valve to cause said first-named means to automatically maintain a different approximately constant volume of flow of the heating medium through the valve, supplemental controlling means whereby the valve will be automatically moved toward the closed position upon the temperature at another key location attaining a predetermined value, and means for automatically adjusting the pressure imposed upon the return of the system according to change of temperature at a selected location.

16. In a heating system, the combination with heating elements of a valve for controlling the supply of heating medium thereto, a pressure device tending to open the valve, an opposing pressure device responsive to pressure change of the medium passing through the valve for automatically maintaining an approximately constant volume of flow of the medium through the valve, and means responsive to change of temperature at a key location for changing the adjustment of the valve to cause said opposing pressure device to automatically maintain a different approximately constant volume of flow of the heating medium through the valve.

17. In a heating system, the combination with heating elements of a valve for controlling the supply of heating medium thereto, a conducting element through which the heating medium passes having a throat, a pressure device tending to open the valve, an opposing pressure device responsive to pressure change of the medium passing through said throat for automatically maintaining an approximately constant volume of flow of the medium through said valve, and means responsive to change of temperature at a key location for changing the adjustment of the valve to cause said opposing pressure device to automatically maintain a different approximately constant volume of flow of the heating medium through the valve.

18. In a heating system, the combination with heating elements of a valve for controlling the supply of heating medium thereto, means responsive to pressure change of the medium passing through the valve for automatically maintaining an approximately constant volume of flow of the medium through the valve, means for changing the adjustment of the valve to cause said first-named means to automatically maintain a different approximately constant volume of flow of the heating medium through the valve, and additional controlling means whereby the valve may be automatically closed.

19. In a heating system, the combination with heating elements of a valve for controlling the supply of heating medium thereto, means responsive to pressure change of the medium passing through the valve for automatically maintaining an approximately constant volume of flow of the medium through the valve, means responsive to change of temperature at a key location for changing the adjustment of the valve to cause said first-named means to automatically maintain a different approximately constant volume of flow of the heating medium through the valve, and supplemental controlling means whereby the valve will be automatically moved towards the closed position upon the temperature at another key location attaining a predetermined value.

20. In a heating system, the combination with heating elements of a valve for controlling the supply of heating medium thereto, a conducting element through which the heating medium passes having a throat, means responsive to pressure change of the medium passing through said throat for automatically maintaining an approximately constant volume of flow of the medium through said valve, means responsive to change of temperature at a key location for changing the adjustment of the valve to cause said first-named means to automatically maintain a different approximately constant volume of flow of the heating medium through the valve, and supplemental controlling means whereby the valve will be automatically moved towards the closed position upon the temperature at another key location attaining a predetermined value.

THOMAS N. ADLAM.